(12) United States Patent
Dezonno et al.

(10) Patent No.: US 7,729,479 B2
(45) Date of Patent: Jun. 1, 2010

(54) AUTOMATIC GENERATION OF MIXED MEDIA MESSAGES

(75) Inventors: Anthony J. Dezonno, Bloomingdale, IL (US); Mike Hollatz, Huntley, IL (US); Michael Peters, Downers Grove, IL (US)

(73) Assignee: Aspect Software, Inc., Lombard, IL (US)

( * ) Notice: Subject to any disclaimer, the term of this patent is extended or adjusted under 35 U.S.C. 154(b) by 1487 days.

(21) Appl. No.: 10/999,445

(22) Filed: Nov. 30, 2004

(65) Prior Publication Data

US 2006/0117098 A1    Jun. 1, 2006

(51) Int. Cl.
*H04M 1/64* (2006.01)
(52) U.S. Cl. ............. 379/88.13; 379/93.23; 379/142.06
(58) Field of Classification Search ............... 379/93.32, 379/88.13, 88.17, 93.01, 201.01, 142.06, 379/265.01, 265.09; 370/261, 265
See application file for complete search history.

(56) References Cited

U.S. PATENT DOCUMENTS

| | | | |
|---|---|---|---|
| 5,555,179 A | 9/1996 | Koyama et al. | |
| 5,765,033 A | 6/1998 | Miloslavsky | |
| 5,884,032 A | 3/1999 | Bateman et al. | |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,345,305 B1 | 2/2002 | Beck et al. | |
| 6,373,836 B1 | 4/2002 | Deryugin et al. | |
| 6,381,645 B1 | 4/2002 | Sassin | |
| 6,389,007 B1 | 5/2002 | Shenkman et al. | |

(Continued)

FOREIGN PATENT DOCUMENTS

WO    WO 00/72535 A1    11/2000

OTHER PUBLICATIONS

United Kingdom Search Report Under Section 17; Date of Search Mar. 30, 2006.

*Primary Examiner*—Olisa Anwah
(74) *Attorney, Agent, or Firm*—Husch Blackwell Sanders Welsh Katz

(57) ABSTRACT

A method and apparatus are provided for processing a contact with a client of an organization. The method includes the steps of a contact processing resource of the organization detecting a contact with the client through a first communication channel operating under a first communication format, the contact processing resource generating an information request based upon the contact with the client, transferring the information request to a media server of the organization and the media server sending an information response to the client through a second communication channel operating under a second communication format.

26 Claims, 1 Drawing Sheet

U.S. PATENT DOCUMENTS

| | | |
|---|---|---|
| 6,393,015 B1 | 5/2002 | Shtivelman |
| 6,438,599 B1 * | 8/2002 | Chack ........................ 709/229 |
| 6,493,447 B1 | 12/2002 | Goss et al. |
| 6,587,758 B2 | 7/2003 | Obradovich et al. |
| 6,587,759 B2 | 7/2003 | Obradovich et al. |
| 6,687,498 B2 | 2/2004 | McKenna et al. |
| 6,732,156 B2 | 5/2004 | Miloslavsky |
| 6,773,351 B2 | 8/2004 | Brown |
| 7,039,170 B1 * | 5/2006 | Sylvain .................... 379/93.23 |
| 7,054,939 B2 * | 5/2006 | Koch et al. ................... 709/227 |
| 7,130,411 B2 * | 10/2006 | Brown et al. ........... 379/266.01 |
| 2004/0039846 A1 | 2/2004 | Goss et al. |
| 2004/0057569 A1 | 3/2004 | Busey et al. |
| 2004/0125877 A1 | 7/2004 | Chang et al. |
| 2005/0111653 A1 * | 5/2005 | Joyce et al. ............. 379/265.09 |

\* cited by examiner

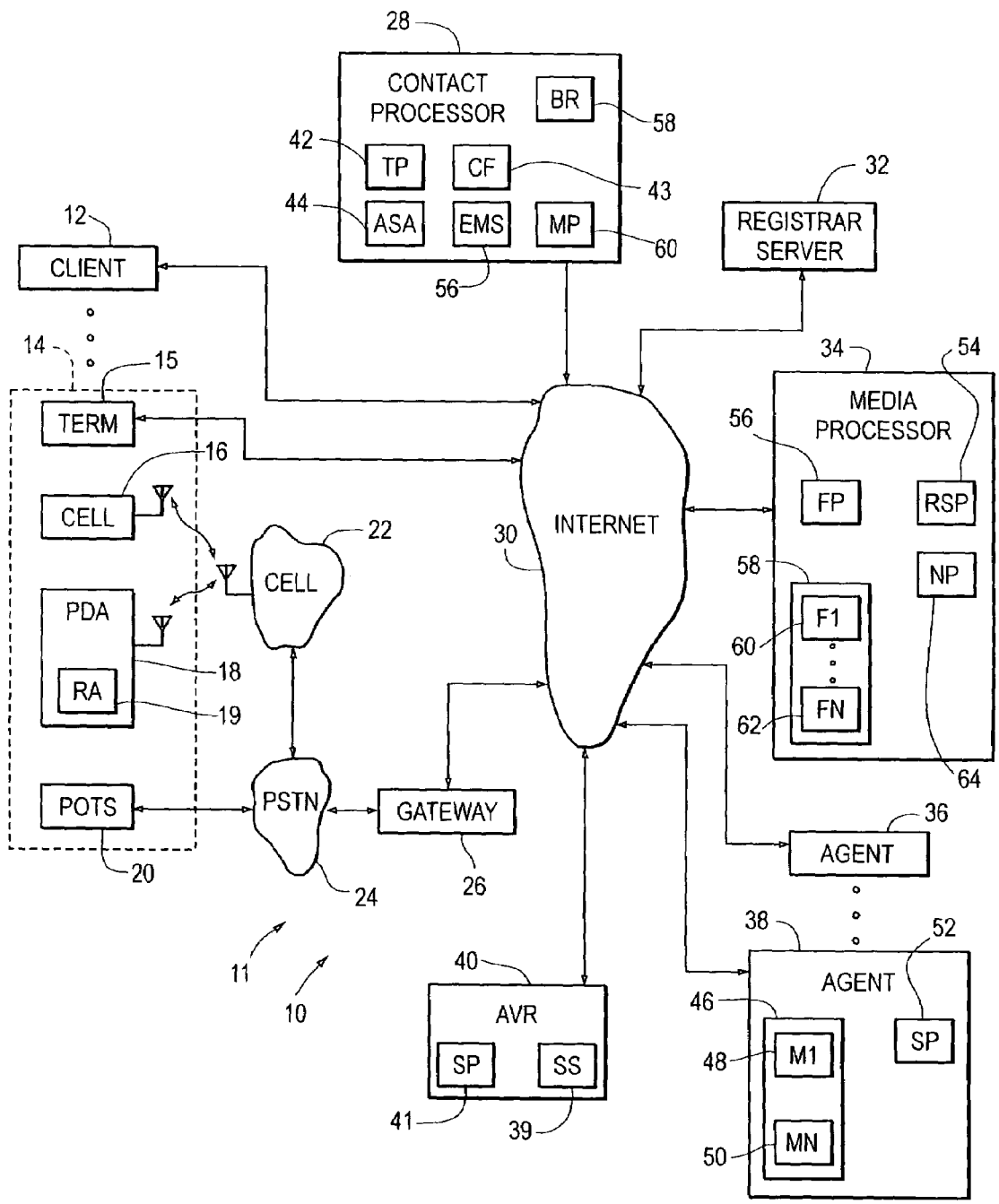

AUTOMATIC GENERATION OF MIXED MEDIA MESSAGES

FIELD OF THE INVENTION

The field of the invention relates to communication systems and more particularly to automatic call distributors.

BACKGROUND OF THE INVENTION

Automatic call distributors (ACDs) are known. Such systems are typically used by organizations to serve large numbers of callers. Typically, calls are directed to a common telephone number and distributed to agents based upon some criteria (e.g., agent idle time).

ACDs can typically process both inbound and outbound calls. Typically, a controller monitors a workload of its agents. Where a workload of received calls fall below some threshold value, the controller may begin to initiate outbound calls.

In addition to placing and distributing calls, an ACD may also identify and display documents on agent terminals as an aid to processing the calls. In the case of incoming calls, the calls may be received along with dialed number identification service (DNIS) and/or automatic number identification (ANI) information. ANI may be used to identify a caller. The controller of the ACD may use the ANI information to retrieve and display customer records on a terminal of the agent selected to handle the call at the same instant that the call is delivered to the agent.

In addition, textual information may be displayed on a terminal of the agent that guides the agent through a sales presentation. DNIS information may be used to identify an intended call target and to select an appropriate sales presentation for use by the agent based upon the intended call target.

In recent years, the functionality of ACDs has been expanded to also include processing contacts through the Internet. While processing contacts through the Internet is often faster and less expensive, the use of the Internet often requires specialized equipment (e.g., a computer, palm pilot, etc.).

In addition, each communication device inherently has only a limited bandwidth, thereby limiting the volume of information that may be exchanged during any one communication session. Because of the importance of communication, a need exists for more flexible methods of delivering information over the Internet.

SUMMARY

A method and apparatus are provided for processing a contact with a client of an organization. The method includes the steps of a contact processing resource of the organization detecting a contact with the client through a first communication channel operating under a first communication format, the contact processing resource generating an information request based upon the contact with the client, transferring the information request to a media server of the organization and the media server sending an information response to the client through a second communication channel operating under a second communication format.

BRIEF DESCRIPTION OF THE DRAWINGS

FIG. 1 is a block diagram of a media distribution system in accordance with an illustrated embodiment of the invention shown in a context of use.

DETAILED DESCRIPTION OF AN ILLUSTRATED EMBODIMENT

FIG. 1 is a block diagram of a media distribution system 10 shown generally under an illustrated embodiment of the invention. The media distribution system 10 may be used by an organization to simultaneously distribute information to its clients 12, 14 through any of a number of different communication channels under different formats.

In general, the system 10 may be used by any of a number of different organizations (e.g., commercial, environmental, political, etc.) to advance the agenda of the organization. In order to promulgate the agenda of the organization with its clients 12, 14, the organization may publish, by advertising or otherwise, one or more telephone numbers, universal resource locators (URLs), instant messaging (IM) addresses or e-mail addresses that identify communication paths to the organization. Clients 12, 14 may use these communication path identifiers to initiate contacts with the organization.

In its simplest form, the media distribution system 10 may include a contact processing resource (e.g., an automatic voice response unit) 40, a media processor 34 and a Session Initiation Protocol (SIP) registrar server 32 (as defined by the Internet Engineering Task Force (IETF) RFC #3261). A client 12, 14 may place a conventional voice call directed to the automatic voice response unit 40 using a plain old telephone service (POTS) telephone 20. To place the call, the client (e.g., 14) may enter a telephone number of the automatic voice response unit 40 through a keypad on the POTS telephone 20. A local switching office within the PSTN 24 may via one or more lookup tables route the call (as a switched circuit connection) directly to the automatic voice response unit 40 or the call may be routed to the automatic voice response unit 40 through a gateway 26.

The gateway 26 may receive the call and determine a call destination via DNIS information delivered along with the call. Again, via one or more lookup tables, the gateway 26 may retrieve an Internet address of the target of the call (i.e., the automatic voice response unit 40). The gateway 26 may complete the end-to-end voice path between the client 14 and automatic voice response unit 40 by assigning a Voice-over-Internet-Protocol (VoIP) application to the call.

Once the call from the client 14 reaches the automatic voice response unit 40, the automatic voice response unit 40 may recognize the client 14 (e.g., via ANI) and audibly present the client 14 with a number of options from which the client 14 may select. The client 14 may make a selection verbally or by activation of a touch-tone key on his POTS telephone 20. In this regard, the automatic voice response unit may recognize the selection via a voice recognition unit or by a frequency recognition unit.

Upon occasion, it may become necessary for the automatic voice response unit 40 to download information to the client 14. For example, if the media distribution system 10 were to be used by a physician, then it may be necessary to download a schedule of available appointment times to the client (patient) 14 and to allow the patent 14 to select a convenient time.

In this regard, the automatic voice response unit 40 may ask the client 14 if the client 14 wants a schedule downloaded to the client 14 and under what format the schedule should be downloaded. To facilitate a decision, the automatic voice response unit 40 may ask the client 14 to identify a channel and format under which the schedule should be downloaded (e.g., Instant Messaging (IM), such as to a PDA 18, a cellphone 16 or terminal 15; e-mail such as to a PDA 18 or terminal 15; voice, such as to the telephone 20, etc.). The client 14 may respond that he wants to receive the schedule under an IM format directed to his PDA 18.

In order to prepare for reception of the schedule, the client 14 may activate his PDA 18 (if not already active). The client 14 may also activate an icon on a display of the PDA 18 that causes a registration application 19 within the PDA 18 to send a SIP REGISTER message (as defined by the IETF RFC #3261 to a SIP registrar 32 registering the PDA 18 as an active communication device (if not already registered).

When the client 14 makes a selection through the automatic voice response unit 40 requesting that the schedule be sent to his PDA 18 under an IM format, the voice response unit 40 detects the selection and activates a selection processor 41. The selection processor 41 retrieves an identifier of the client 14, an information delivery channel and a format selection choice of the client 14 and transfers an information request (that includes the identifier and selection choice) to a channel selection processor 54 within a media processor 34.

The channel selection processor 54 receives the identifier and selection choice and composes a SIP SUBSCRIBE message (as defined by IETF RFC #3261) based upon the identifier of the client 14. The channel selection processor 54 may transfer the SIP SUBSCRIBE message to a registrar server 32.

Using the identifier of the client 14, the SIP registrar 32 may search for any devices 15, 16, 18, 20 registered as being active by the client 14. Upon identifying any records of active devices previously registered with the registrar server 32 by the client 14, the registrar server 32 may return a SIP NOTIFY message to the media processor 34 notifying the media processor 34 of the registration and IP address of any active devices (e.g., the PDA 18).

If the channel selection processor 54, by reference to the registrar server 32, determines that the client's PDA 18 is active, then the channel selection processor 54 may retrieve and transfer a path identifier of the active channel (i.e., the PDA 18) to a file processor 56. The file processor 56 may search for a file that is compatible with the PDA 18. In this regard, the file processor 56 may search for and identify a file 60, 62 with a .vcal extension. In this regard, the .vcal extension may indicate a file that is compatible with and that can be displayed by an address book/calendar application within the PDA 18.

Once a file 60, 62 is identified, the file processor 56 may download the file to the PDA 18. The PDA 18 may receive and display the file of available appointment times on the PDA 18 for the benefit of the client 14.

Once the files is displayed on the PDA 18 of the client 14, the client 14 may select an appointment. Selection of an appointment may be made by the client 14 by simply reciting the date and time over the voice connection with the automatic voice response unit 40. The automatic voice response unit 40 may receive and enter the selected appointment time in a scheduling server 39. Alternatively, the calendar displayed on the PDA 18 of the client 14 may have a number of hyperlinks embedded into the displayed calendar. Activation of any particular hyperlink may transfer an appointment selection back to the scheduling server 39 within the automatic voice response unit 40.

As another alternative, the media distribution system 10 may be incorporated into an automatic contact distribution system 11 that both receives and places calls to clients 12, 14. In this case, the organization may purchase contact lists that include customer profiles. The customer profiles may include communication path identifiers of potential clients and may allow the organization to place outgoing contacts directed towards the clients 12, 14, 16, 18.

In either case (whether contacts are incoming or outgoing), contacts with clients 12, 14 of the organization may be connected to a contact processing resource (e.g., automatic voice response unit 40, agents 36, 38, etc.) over a first communication channel and under a first communication format. As above, the contact processing resource may determine a type of information that is to be sent to the client 12, 14 and may generate an information request for information that is to be downloaded to the client 12, 14 over a second communication channel and under a second communication format.

As a first step, incoming or outgoing contacts may be directed to a contact processor 28. In each case, the contact processor 28 may open a contact file 43 for each contact to track a progress of the contact. The file may contain a unique contact identifier, a source identifier and any contact associated information. The unique contact identifier may be assigned by the contact processor 28 and may be used as a contact (file) identifier.

The source identifier may be retrieved from the delivered contact or from the externally provided contact file (in the case of purchased customer lists). For example, in the case of an incoming e-mail, the source identifier may be an e-mail address retrieved from a "FROM" field of the e-mail. Similarly, in the case of an incoming instant message (IM), the source identifier may be a source URL, again retrieved from a "FROM" field of the IM.

In the case of contacts from a client 12, 14 through the gateway 26 (e.g., through cellphones 16, personal digital assistants (PDAs) 18, plain old telephone service (POTS) telephones 20, etc.) the contacts may be established and source identification information obtained via operation of the gateway 26. In the case of cellphone calls or calls from a POTS telephone, a voice path of the contact may be established from the gateway 26 to the contact distribution system 11 using a VoIP interface. Source identification information may be provided by ANI information delivered through the Internet 30 to the contact processor 28 along with the call.

In the case of outbound calls initiated by the contact processor 28, files may be opened in a similar manner. However, since the contact processor 28 would have initiated the contact, the contact processor 28 may be presumed to have an identifier of the client 12, 14 and know the purpose of the call for use as contact associated information.

Once contacts are completed between the client 12, 14 and call processor 28, the call processor 28 may transfer the contact to a typing processor 42. The typing processor 42 may determine a type of contact involved based upon call associated information and the identity of the contact target.

Once a call type is determined, the contact may be transferred to an agent selection application 44. The agent selection application 44 may select an agent 36, 38 to handle the contact. The agent 36, 38 may be selected based upon any criteria (e.g., longest available, type of contact involved, etc.).

Once an agent 36, 38 has been selected, the agent selection application 44 may transfer the contact to the agent 36, 38. Transferring the contact to the selected agent 36, 38 may involve transferring a communication path identifier to the agent 36, 38 and automatically activating an appropriate communication application (e.g., OUTLOOK, VoIP, etc.).

Once transferred to the agent 36, 38, the agent 36, 38 may converse with the client 12, 14, accept orders from the client and enter information through the terminal of the agent for storage in a database of the organization. The agent 36, 38 may also upon occasion transfer information to the client 12, 14.

If agent selection was based upon call type, then a display 46 on a terminal of the agent 36, 38 may display a number of icons (softkeys) 48, 60 that identify information files that are associated with the identified type of contact and that may increase the overall efficiency of the contact with the client 12, 14. To transfer information to the client 12, 14, the agent 36, 38 may activate a softkey 48, 50 associated with the information on a display 46 of the agent 36, 38. Activation of the softkey 48, 50 may activate an information transfer application within the terminal of the agent 36, 38.

Activation of a particular softkey 48, 50 may cause the information transfer application to transfer an information request including an identifier of the softkey and contact information to a media processor 34. Receipt of the transferred information request may cause a media processor 34 to identify and transfer the information to the client 12, 14 over a channel that is different in identity and format than the channel over which the original contact was established.

For example, if the organization using the media distribution system 10 were marketing tickets for sporting events, the client 12, 14 may be a caller intent on buying a ticket to the sporting event. The contact may be placed by the client 14 over a cellphone 16 and transferred to the agent 38.

After determining the purpose of the contact, the agent 38 may activate a softkey (e.g., 48) to download a map of a stadium to the client 14. Activation of the softkey 48 may cause a selection processor 52 to capture a source identifier of the contact (e.g., the cellphone number) and an identifier of the softkey 48. Upon capturing the source identifier and softkey 48, the selection processor 52 may transfer the collected information to a channel selection processor 54 within a media processor 34. The channel selection processor 54 may transfer a SIP SUBSCRIBE messages to a SIP registrar server 32.

In this regard, the clients 12, 14 may have previously sent a SIP REGISTER message (as defined by IETF RFC #3261) to the registrar server 32 for communication channels over which the client 12, 14 is currently active. Alternatively, the client 12, 14 may have only sent a SIP REGISTER message for a specific channel (e.g. for the terminal 15, a display on a cellphone having Internet access, etc.).

If the channel selection processor 54, by reference to the registrar server 32 should determine that the client's terminal 15 is active, then the channel selection processor 54 may retrieve and transfer a path identifier of the active channel (i.e., the terminal 15) to a file processor 56. The file processor 56 may search a set of files for a stadium map that is compatible with the terminal 15. In this regard, the file processor 56 may search for a file 60, 62 with an appropriate file extension (e.g., web page, pdf, bitmap, etc.).

Once a file 60, 62 is identified, the file processor 56 may download the file to the terminal 15. The terminal 15 may display the file of available seats within the stadium.

Once the files is displayed on the terminal 15 of the client 14, the client 14 may select a ticket location. Selection of a ticket may be made by simply reciting the location over the voice connection through the cellphone 16 to the agent 38. Alternatively, the map displayed on the terminal 15 of the client 14 may have one or more hyperlinks embedded into the displayed map. Activation of any particular hyperlink may transfer a seat selection back to the agent 38.

Under another illustrated embodiment, the client 12, 14 may ask the agent 38 to be notified if better tickets become available and may specify a desired location of the better tickets. In this regard, the agent 38 may activate a waiting list softkey on the terminal 38 and enter a ticket location identifier. Activation of a waiting list softkey and entry of a ticket location identifier may cause the terminal 38 to register an identifier of the client 12, 14 and desired ticket with a notification processor 64.

If the desired tickets become available, then the notification processor 64 may detect the availability and unilaterally compose a SIP SUBSCRIBE message to the registrar server 32 using the identifier of the client 12, 14. If the registrar server 32 returns an identifier of an active communication channel, then the notification processor 64 may transfer an identifier of the active channel and identifier of the desired tickets to the file processor 56. The file processor 56 may search for and identify a file compatible with the identified communication channel. The file processor 56 may then send the file to the client 12, 14 notifying the client 12, 14 of the availability of the more desirable tickets. The downloaded file may contain hyperlinks that allow the client 12, 14 to either accept or reject the more desirable tickets.

In another alternative, the availability and downloading of information may occur automatically under a set of business rules of the organization operating the media distribution system 10. For example, if the contact arrives at contact processor 28 of the media distribution system 10 outside of normal working hours, then the contact processor 28 may respond to the contact according to one of a set of predetermined rules.

For example, if a client 12, 14 were to send an e-mail to an e-mail server 56 of the organization, the type processor 42 may open a contact file 43 and determine a type of contact involved, as described above. Once a type of contact has been determined, the type processor 42 may transfer the contact file to the agent selection application 44. The agent selection application 44 may determine that the e-mail arrived after-hours and may refer to a set of business rules 58 for an appropriate response. In this regard, the media distribution system 10 may respond under another format notifying the client 14 that the e-mail arrived after hours and offering the client other options.

Accordingly, the agent selection application 44 may transfer the contact to a message processor 60 that may determine an appropriate message type based upon the contact type. For example, if the organization using the media distribution system 10 were a merchant that receives an IM after hours, then the business rules may require that a response should include a path to a web page of the merchant that provides business hours and possibly a hyperlink to a website of the merchant.

Once a message type has been determined, the message processor 60 may transfer the contact file 43 along with an identifier of the determined message to the channel selection processor 54. As above, the channel selection processor 54 may transfer a request (e.g., a SIP SUBSCRIBE message) to the registrar server 32 to determine whether the client 14 is currently registered as being active through any other communication channels. If the registrar server 32 is able to identify any active channels (e.g., PDA, cellphone, terminal, etc.), then the file processor 56 may identify and download an appropriate information file 60, 62 as described above.

A specific embodiment of method and apparatus for processing contacts with clients of organizations has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of processing a contact with a client of an organization, such method comprising:
   a contact processing resource of the organization detecting a contact with the client through a first communication channel operating under a first communication format and recovering an identifier of the client through the first communication channel;
   the contact processing resource generating an information request based upon the contact with the client;
   transferring the information request to a media server of the organization;
   retrieving a set of Internet addresses of active communication channels of the client from a SIP registrar; and
   the media server selecting an active communication channel from the set of active communication channels as a second communication channel based upon a set of business rules and sending an information response to the client through the second communication channel operating under a second communication format where the second communication channel and second communication format are both different than the first channel and first communication format.

2. The method of processing the contact as in claim 1 further comprising recovering the second format from the client through the first communication channel.

3. The method of processing the contact as in claim 2 further comprising retrieving a source identifier of the contact.

4. The method of processing the contact as in claim 3 further comprising retrieving an information file compatible with the format of the second communication channel from a memory of the media server.

5. The method of processing the contact as in claim 2 further comprising determining a type of the contact based upon call associated information.

6. The method of processing the contact as in claim 5 further comprising selecting a message type for the information response based upon the contact type.

7. The method of processing the contact as in claim 1 wherein the step of generating the information request further comprises the contact processing resource presenting the client with a plurality of information presentation options and the client selecting one of the plurality of information presentation options.

8. The method of processing the contact as in claim 7 wherein the first channel further comprises a voice channel and one of the plurality of information presentation options is for presentation of the information response as an instant message through the second communication channel.

9. The method of processing the contact as in claim 1 further comprising defining the information response as a set of client-selectable options.

10. The method of processing the contact as in claim 9 further comprising the client electing one of the set of client-selectable options through the first channel.

11. An apparatus for processing a contact with a client of an organization, such apparatus comprising:
    means for detecting a contact with the client through a first communication channel operating under a first communication format;
    means for recovering an identifier of the client through the first communication channel;
    means for generating an information request based upon the contact with the client;
    means for retrieving a set of Internet addresses of active communication channels of the client;
    means for selecting an active communication channel of the set of active communication channels as a second communication channel based upon a set of business rules; and
    means for sending a response to the information request to the client through the second communication channel operating under a second communication format.

12. The apparatus for processing the contact as in claim 11 further comprising means for recovering the second format from the client through the first communication channel.

13. The apparatus for processing the contact as in claim 12 further comprising means for retrieving a source identifier of the contact.

14. The apparatus for processing the contact as in claim 13 further comprising means for retrieving an information file compatible with a format of the active communication channel from a memory of the media server.

15. The apparatus for processing the contact as in claim 12 further comprising means for determining a type of the contact based upon call associated information.

16. The apparatus for processing the contact as in claim 15 further comprising means for selecting a message type for the response based upon the contact type.

17. The apparatus for processing the contact as in claim 11 wherein the means for generating the information request further comprises means for presenting the client with a plurality of information presentation options and for allowing the client to select one of the plurality of information presentation options.

18. The apparatus for processing the contact as in claim 17 wherein the first channel further comprises a voice channel and one of the plurality of information presentation options is for presentation of the information response as an instant message through the second communication channel.

19. The apparatus for processing the contact as in claim 11 further comprising means for defining the information response as a set of client-selectable options.

20. The apparatus for processing the contact as in claim 19 further comprising means for allowing the client to elect one of the set of client-selectable options through the first channel.

21. An apparatus for processing a contact with a client of an organization, such apparatus comprising:
    a contact processing resource that detects a contact with the client and an identifier of the client through a first communication channel operating under a first communication format and that generates an information request based upon the contact with the client; and
    a media server that receives the information request and retrieves a set of internet addresses of active communication channels of the client, selects an active communication channel from the set of active communication channels as a second communication channel based upon a set of business rules, and sends a response to the information request to the client through the second communication channel operating under a second communication format.

22. The apparatus for processing the contact as in claim 21 further comprising recovering the second format from the client through the first communication channel.

23. The apparatus for processing the contact as in claim 22 further comprises a channel selection processor that retrieves an Internet address of an active communication channel of the client from a SIP registrar.

24. The apparatus for processing the contact as in claim 23 further comprising an information file compatible with a format of the active communication channel that is retrieved from a memory of the media server based upon a format of the second channel.

25. The apparatus for processing the contact as in claim 21 wherein the means for generating the information request further comprises an automatic voice response unit that presents the client with a plurality of information presentation options and allows the client to select one of the plurality of information presentation options.

26. The apparatus for processing the contact as in claim 25 wherein the first channel further comprises a voice channel and one of the plurality of information presentation options is for presentation of the information response as an instant message through the second communication channel.

* * * * *